(12) United States Patent
Reynolds et al.

(10) Patent No.: US 11,987,216 B2
(45) Date of Patent: May 21, 2024

(54) ADJUSTABLE ROCK KNOCKER BRACKET

(71) Applicant: Austin Engineering USA Services, Inc., Casper, WY (US)

(72) Inventors: Seth J. E. Reynolds, Casper, WY (US); Frederick J. Reynolds, Casper, WY (US)

(73) Assignee: Austin Engineering USA Services, Inc., Mills, WY (US)

( * ) Notice: Subject to any disclaimer, the term of this patent is extended or adjusted under 35 U.S.C. 154(b) by 286 days.

(21) Appl. No.: 17/632,046

(22) PCT Filed: Sep. 23, 2020

(86) PCT No.: PCT/US2020/052105
§ 371 (c)(1),
(2) Date: Feb. 1, 2022

(87) PCT Pub. No.: WO2021/061700
PCT Pub. Date: Apr. 1, 2021

(65) Prior Publication Data
US 2023/0356697 A1    Nov. 9, 2023

Related U.S. Application Data

(60) Provisional application No. 62/907,429, filed on Sep. 27, 2019.

(51) Int. Cl.
*B60S 1/68* (2006.01)
(52) U.S. Cl.
CPC ...................... *B60S 1/68* (2013.01)

(58) Field of Classification Search
CPC ........................................................ B60S 1/68
See application file for complete search history.

(56) References Cited

U.S. PATENT DOCUMENTS

| | | | | |
|---|---|---|---|---|
| 2,738,986 A * | 3/1956 | Pelton | ...................... | B60S 1/68 280/856 |
| 2,799,515 A * | 7/1957 | Lobozzo | ................... | B60S 1/68 280/856 |
| 2,839,313 A * | 6/1958 | Walko | ...................... | B60S 1/68 280/856 |
| 3,464,714 A * | 9/1969 | Prillinger | .................. | B60S 1/68 280/855 |
| 3,788,668 A * | 1/1974 | Perger | .................. | B62D 25/188 280/856 |

(Continued)

*Primary Examiner* — Jacob B Meyer
(74) *Attorney, Agent, or Firm* — ColterJennings

(57) ABSTRACT

A rock knocker bracket holds a rock ejector such as a chain or bar that is used to clear debris from the gap between two tires of a mining vehicle. The rock ejector is pivotally mounted on a horizontal, lateral pin that is held at both ends by side plates of the bracket. The pin has a series of holes formed along its length. Bar retainers and washers mounted on the pin allow the rock ejector to be moved laterally along the pin and thereby provide for different laterally spacing configurations of the tires. Fasteners pass through holes in the bar retainers and the holes in the pin to hold the rock ejector at a predetermined lateral location along the pin. Alternative designs for the pin and the bracket include other systems for laterally moving the rock ejector and mounting it in the predetermined lateral position.

20 Claims, 14 Drawing Sheets

(56) References Cited

U.S. PATENT DOCUMENTS

| | | | | |
|---|---|---|---|---|
| 3,913,943 | A * | 10/1975 | Tamburino | B60S 1/68 |
| | | | | 301/36.3 |
| 7,131,670 | B2 * | 11/2006 | Kinoshita | B60B 11/00 |
| | | | | 301/36.3 |
| 8,690,193 | B2 * | 4/2014 | Yamamoto | B60P 1/283 |
| | | | | 280/856 |
| 9,120,466 | B2 * | 9/2015 | Lindemeier | B60S 1/68 |
| 9,434,358 | B2 * | 9/2016 | Montgomery | B60S 3/042 |
| 11,279,326 | B1 * | 3/2022 | Siegel, Jr. | B60S 1/68 |
| 2005/0040695 | A1 * | 2/2005 | Kinoshita | B60B 11/00 |
| | | | | 301/36.3 |
| 2012/0205961 | A1 * | 8/2012 | Yamamoto | B60P 1/283 |
| | | | | 298/17 T |
| 2023/0356697 | A1 * | 11/2023 | Reynolds | B60S 1/68 |

* cited by examiner

ADJUSTABLE ROCK KNOCKER BRACKET

This application claims priority based on U.S. Provisional Patent Application Ser. No. 62/907,429 filed 27 Sep. 2019 and titled "Adjustable Rock Knocker Bracket" the disclosure of which is incorporated herein by this reference.

BACKGROUND

This disclosure relates to an adjustable bracket for mounting a rock knocker or rock ejector, such as a chain or rock knocker bar, for removing rocks from between truck tires. In particular, this disclosure relates to a rock knocker that is suspended on a bracket above the gap between two adjoining tires and extends downward into the gap and removes rocks and other debris lodged in that gap.

Trucks that have dual tires on the rear axle often get rocks stuck between the dual tires. In some embodiments, a chain is affixed to the bottom of the truck body and hung between the tires. In other embodiments, an ejector bar placed midway between the tires hangs from the chassis or body above the tires. When a rock gets stuck in between the rotating tires, the chain or bar will act like an ejector and the rock will become displaced out from between the tires.

These rock removal devices are generally shipped loose and installed by means of welding in the field once the truck body is placed on a chassis. The reason for being shipped loose is that there are differences in tires and/or rims, or the truck body may be shimmed differently than perfect center or simply that manufacturing tolerances in the fabrication of the truck body require a later fit of all the components. The ejector bar or chain needs to be placed as close to the midpoint between the dual tires, and thus that placement is done in the field. In other circumstances, if the bar is not in the center of the dual tires and off to one side, the ejector bar will rub the tire and can cause damage to the tire. In the field, such placement can be very difficult, often involving little more than pure luck. Such in-field installation results in high cost and creates a potential safety issue with the workers installing these prior rock knocker brackets.

There are other problems as well. For example, trucks in the field often change tires and thus the distance between the tires may change. Other times, the truck bodies are swapped between different chassis when the truck bodies are removed for maintenance. Typically, this involves removing the bracket and reinstalling it by welding in a new location. Again, this creates cost and safety issues and some locations may not having welding available. Often, these prior brackets allow very little (if any) ability to make adjustments to the lateral spacing of the rock knocker bar. As a result, to change the lateral location of the rock knocker bar, the entire bracket needed to be cut from the bottom of the truck body and re-welded to the bottom in a new location. Hence, a rock knocker mounting bracket that permitted such adjustments could save significant expenses.

SUMMARY

The present disclosure provides an adjustable rock knocker mounting bracket that overcomes many of the shortfalls of prior designs. In particular, the adjustable rock knocker bracket may be installed at the factory in a safer environment. The adjustable mounting bracket allows adjustment of the lateral location of the rock ejector. The ejector may thus be located, in the field, to fall directly between the tires, thereby reducing the risk of damage to the tires, even new tires with different sizing, and yet the rock ejector is still placed in a good position for prying out rocks and other debris that may become lodged in the gap between those tires.

The present rock knocker assembly includes a rock ejector, such as a bar that extends down from a rock knocker bracket. The bracket is affixed to the bottom of a truck body. The bracket holds a laterally mounted pin (that is, the pin extends horizontally in the side-to-side direction of the truck body). The upper end of the rock knocker bar is slidingly mounted to that pin.

Two bar retainers are also slidingly mounted to the pin, one on each side of the upper end of the rock knocker bar. The bar retainers may be affixed on the pin (in an exemplary embodiment, by using bolts that pass through the bar retainers and the pin and may have nuts threaded onto the bolt) so as to hold the rock knocker bar in the designated lateral location on the pin. Washers may be placed on the pin between each bar retainer and the rock knocker bar to facilitate rotational movement of the rock knocker bar about the axis of the pin.

In operation, when the rock ejector needs to be relocated, a worker releases the bar retainers (such as by taking the nut off the end of each bolt and pulling the bolt out of the pin and bar retainer). The bar retainers, rock ejector, and any washers may then be slid in either lateral direction to realign the rock ejector in a different lateral position, depending on where the center of the area between the tires is located. The bar retainers are then placed alongside the rock ejector (and any washers being used) and the bolt and nut re-affixed to the pin. The rock ejector is thus placed in the proper position for knocking rocks and other debris out from between the tires.

BRIEF DESCRIPTION OF THE DRAWINGS

Other features and advantages of the present disclosure will be apparent from reference to the following Detailed Description taken in conjunction with the accompanying Drawings, in which.

DETAILED DESCRIPTION

Figure 1:
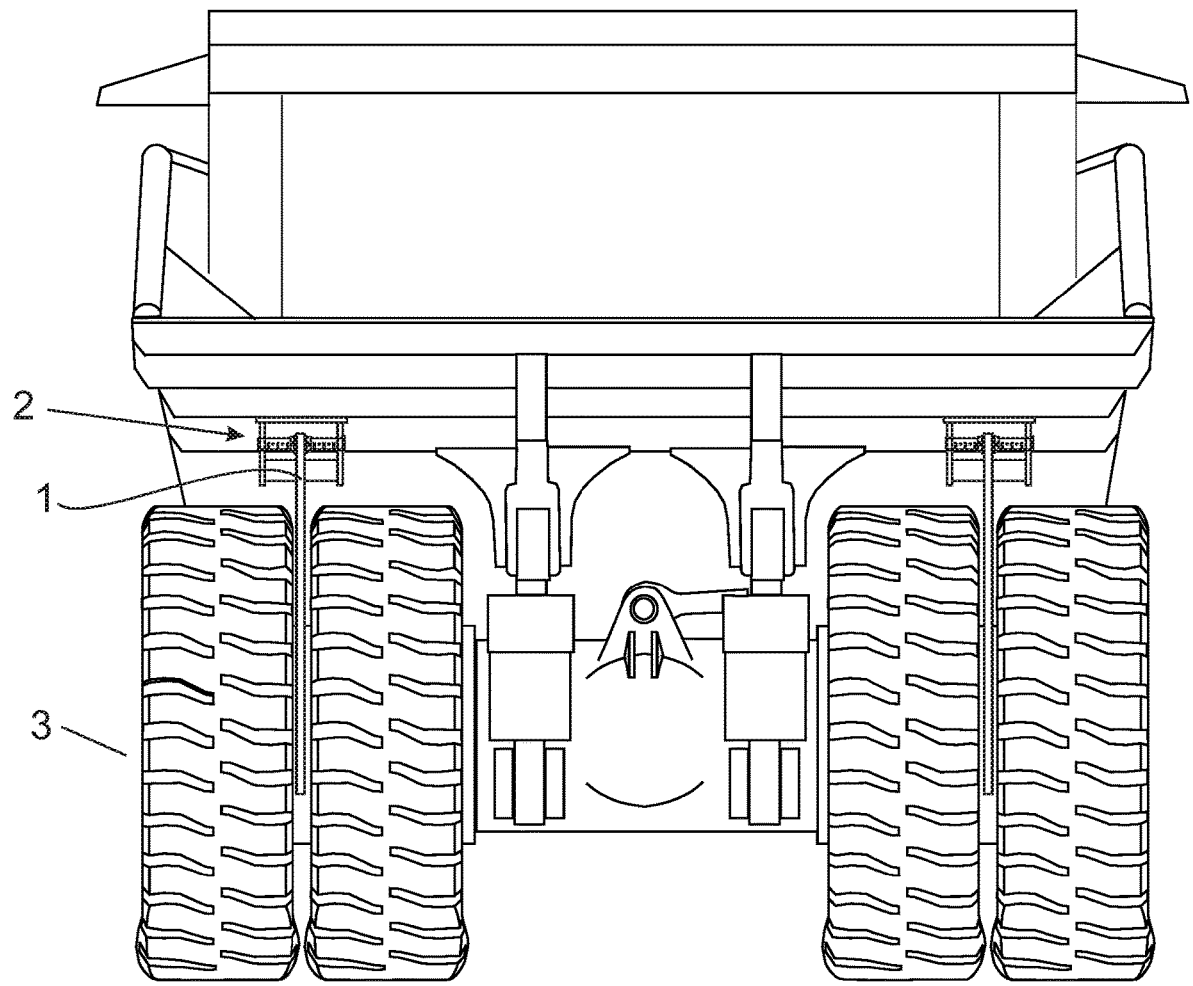
FIG. 1 depicts a schematic rear view of dual pair tire truck chassis and body with an adjustable rock knocker bracket mounted above each pair of tires with a rock knocker bar extending downwardly from each bracket, as described in the present disclosure.
Figure 2:
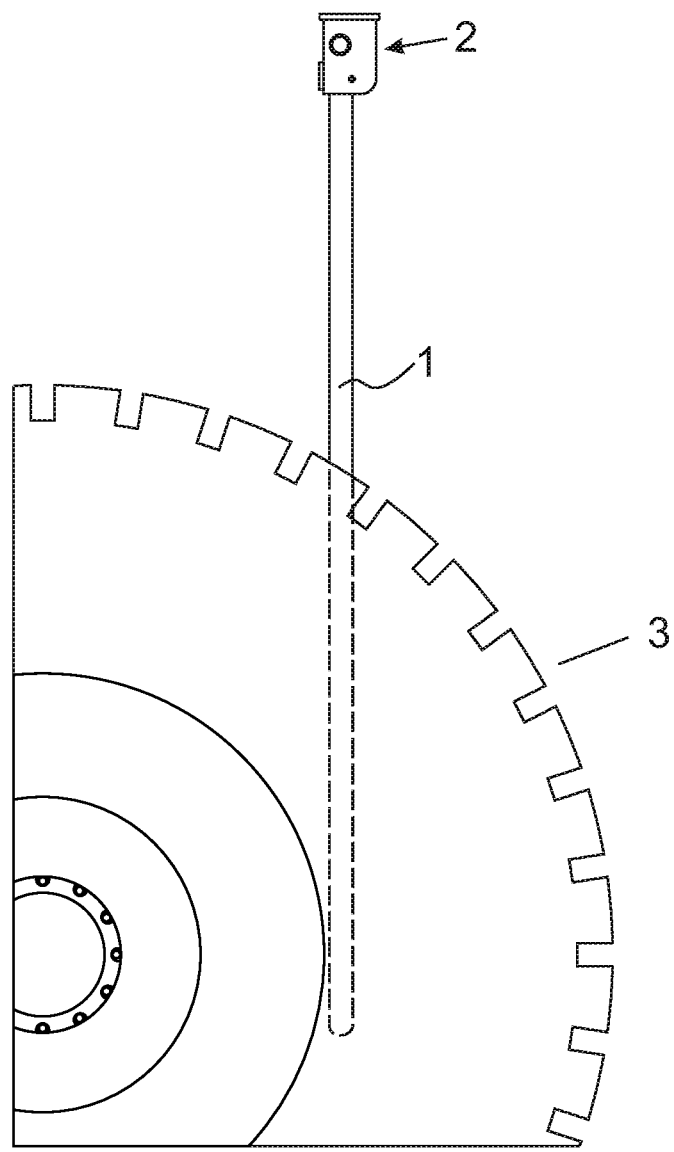
FIG. 2 depicts a schematic side view of an adjustable rock knocker bracket mounted above a tire, with a rock knocker bar extending downwardly from the bracket, as described in the present disclosure.

FIG. 1 depicts a rear view of a truck chassis and body, the chassis having a pair of duel tires 3. An adjustable rock knocker bracket 2 mounted above each pair of tires mounts a rock ejector such as a chain or a rock knocker bar 1 so as to extend downwardly from each bracket 2. FIG. 2 depicts a side view of the adjustable rock knocker bracket 2 mounted above a tire 3, with the rock knocker bar 1 extending downwardly from the bracket. As can be seen, when the bracket 2 is mounted on a truck body, the rock knocker bar 1 descends from the rock knocker bracket 2 into the space between the tires 3 of the vehicle.

Figure 3:
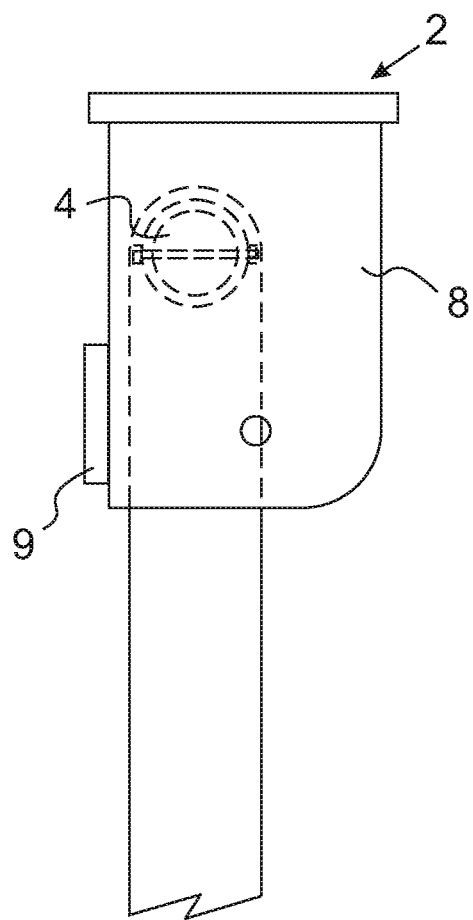
FIG. 3 depicts a close up side view of the adjustable rock knocker bracket of FIGS. 1 and 2.
Figure 4:
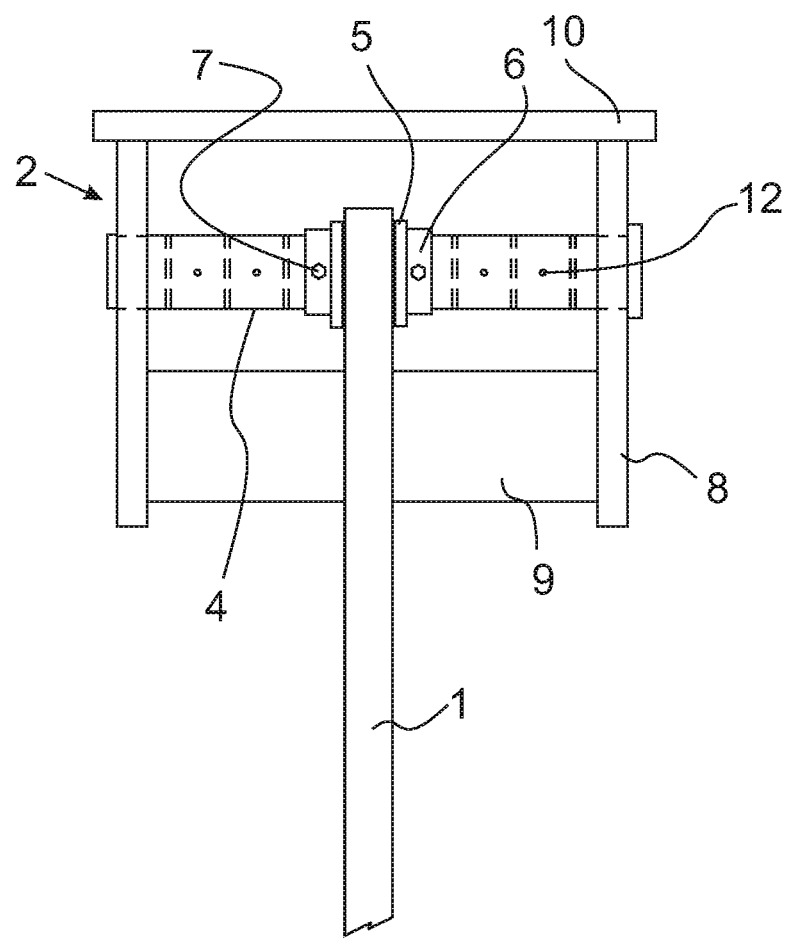
FIG. 4 depicts a rear view of the rock knocker bracket of FIGS. 1, 2, and 3.

FIG. 3 depicts a closer side view of the rock knocker bracket 2. FIG. 4 depicts a close-up rear view of the rock knocker bar 1 mounted in the bracket 2. As can be seen, the top end of the rock knocker bar 1 has an opening into which a pin 4 is inserted, and the pin 4 is then affixed to end side supports 8 of the bracket 2. The rock knocker bar 1 may therefor pivot about the pin 4. Typically, the rock knocker bar 1 may pivot over 90° upwards towards the back of the truck body onto which the bracket 2 may be mounted. In some embodiments, the rock knocker bracket 2 includes a bar stop plate 9 that blocks the rock knocker bar 1 from pivotal movement much beyond a few degrees in the other direction (that is, toward the front of the truck body).

In the embodiment depicted in FIGS. 1-4, the pin 4 has a series of holes 12 therein that extend along the length of the pin 4. When the bracket 2 is affixed to a truck body, the holes 12 are laterally spaced along the pin 4 and thus under the truck body. As depicted in FIG. 4, bar retainers 6 are slipped on the pin 4 on opposite lateral sides of the upper end of the rock knocker bar 1. In this embodiment, spacers or washers 5 between the bar retainers 6 and the upper end of the rock knocker bar 1 hold the rock knocker bar 1 away from the bar retainers 6. These washers 5 assist in keeping the rock knocker bar 1 rotational about the pin 4.

Figure 5:
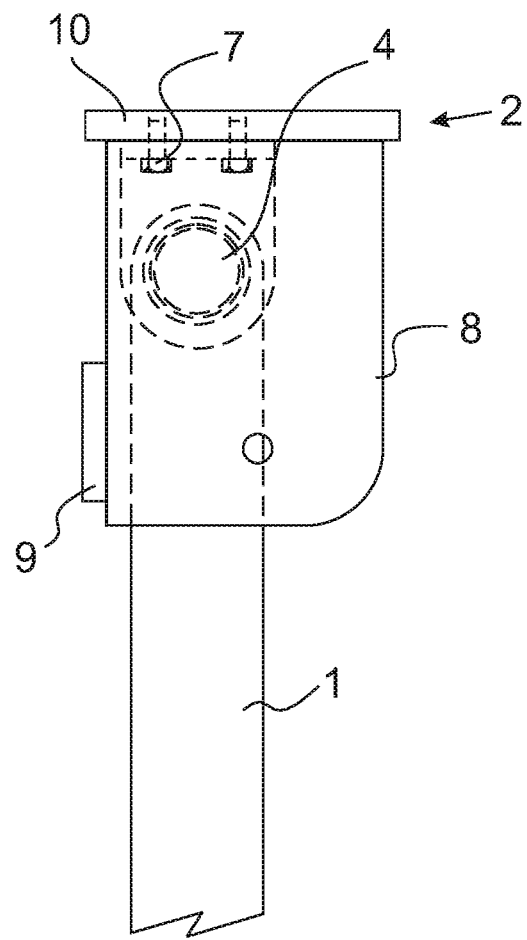
FIG. 5 depicts a close up side view of an adjustable rock knocker bracket according to an alternative embodiment of the present disclosure.
Figure 6:
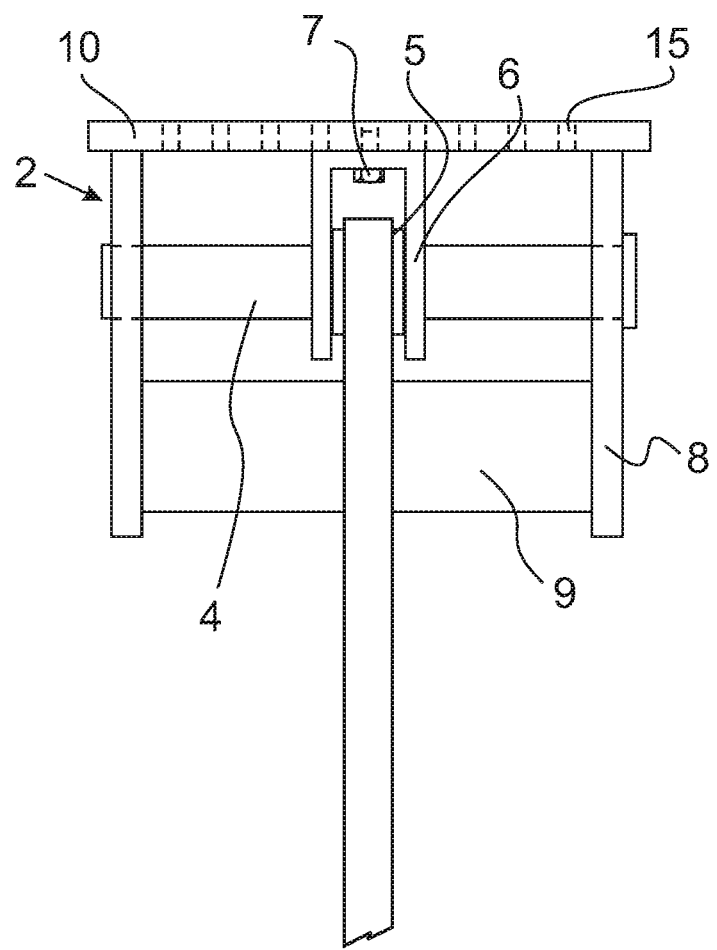
FIG. 6 depicts a close-up rear view of the rock knocker bracket of FIG. 5.

FIGS. 5 and 6 depict close-up side and rear views of a rock knocker bracket 2 according to another embodiment. As depicted, the top end of a rock knocker bar 1 has an opening onto which a pin 4 is connected, and the pin is then affixed to end side supports 8 of the bracket 2. The rock knocker bar 1 may therefor pivot about the pin. Typically, the rock knocker bar may pivot over 90° upwards towards the back of the truck body onto which the bracket may be mounted. In some embodiments, the rock knocker bracket 2 includes a bar stop plate 9 that blocks the rock knocker bar 1 from pivotal movement much beyond a few degrees in the other direction (that is, toward the front of the truck body). In this embodiment, a U-shaped bar retainer 6 is mounted about the pin 4 so that the sides of the bar retainer extend down on both sides of the rock knocker bar 1. A washer 5 is typically placed on the pin 4 on each side of the top of the rock knocker bar 1.

Figure 7:
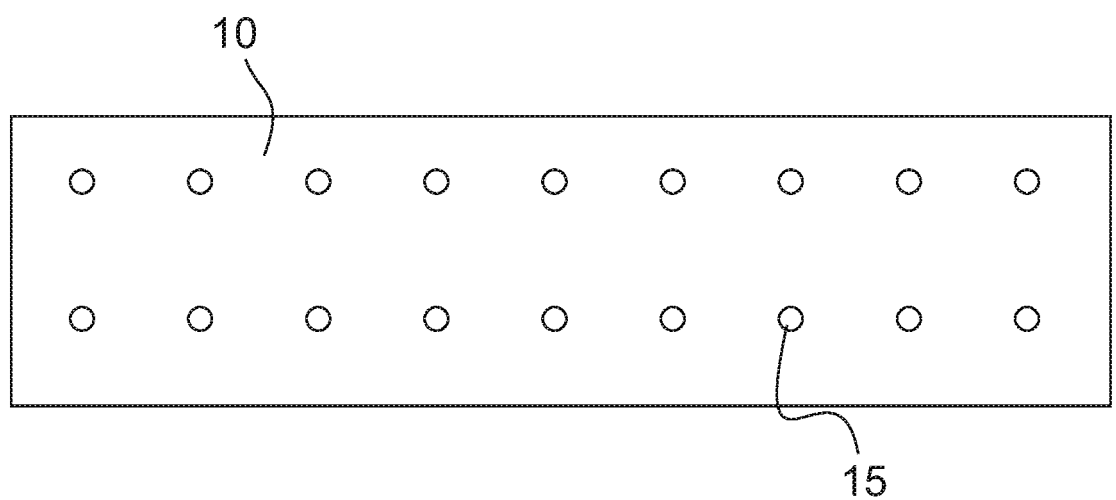
FIG. 7 depicts a top view of the top plate of the rock knocker bracket depicted in FIG. 6.

In this embodiment, the top of the bar retainer includes holes through which one or more fasteners may be inserted. In the figures, the fasteners are depicted as bolts 7, but other types of fasteners may be used, as is known in the art. As depicted in FIG. 7, according to this embodiment, the top plate 10 of the bracket 2 has a plurality of threaded holes 15 along its length through which one or more bolts 7 may be screwed on, thereby mounting the top plate 10 of the bar retainer 6 to the rock knocker bracket 2. Thus, to laterally move the bar retainer 6 (and thus the rock knocker bar 1), the bolts 7 are loosened, the bolts 7 drawn out of the holes 15, and the rock knocker bar 1 and bar retainer 6 are slid along the pin 4 in the desired lateral direction. When the rock knocker bar 1 is aligned in the chosen lateral position, the bolts 7 are re-threaded into the appropriate holes 15, and the rock knocker bar 1 is set into the new location.

Figure 8A:
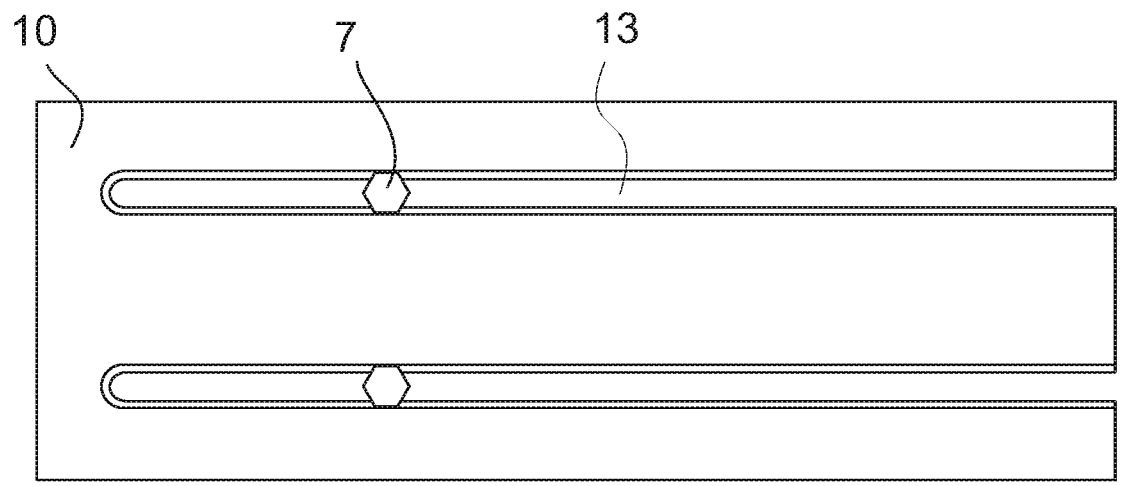
FIG. 8A depicts a top view of a top plate according to a different embodiment.
Figure 8B:
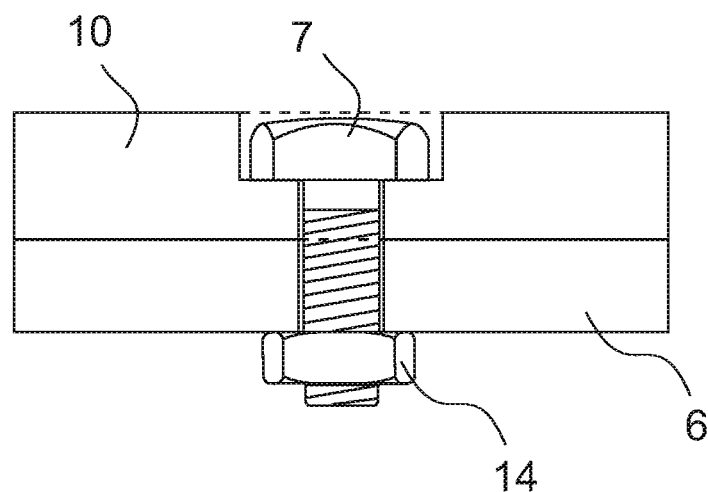
FIG. 8B depicts a side view of the top plate of FIG. 8A showing a bolt extending through the top plate.

FIGS. 8A and 8B depict a top view and a cutaway side view, respectively, of an alternate design for the top plate 10. According to this embodiment, bolts slots 13 are machined in the top plate 10. Bolts 7 holding the bar retainer 6 extend down through the slots 13 and through the bar retainer 6 and are affixed to the top plate 10 using nuts 14. Thus, to re-position the rock knocker bar 1, the nuts 14 are loosened and the bar retainer 6 is slid laterally until it reaches the proper alignment to place the rock knocker bar 1 between the tires 3. The nuts 14 are then tightened to hold the rock knocker bar 1 in that position.

Figure 9:
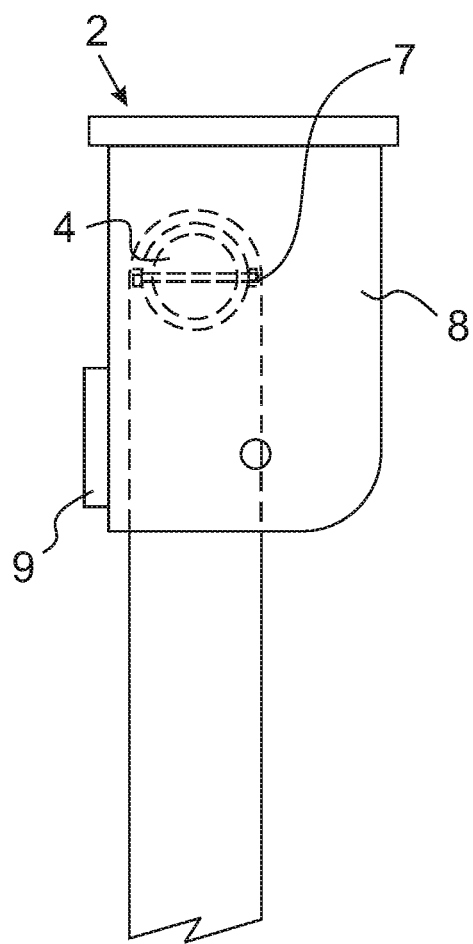
FIG. 9 depicts a close up side view of an adjustable rock knocker bracket according to another embodiment of the present disclosure.
Figure 10:
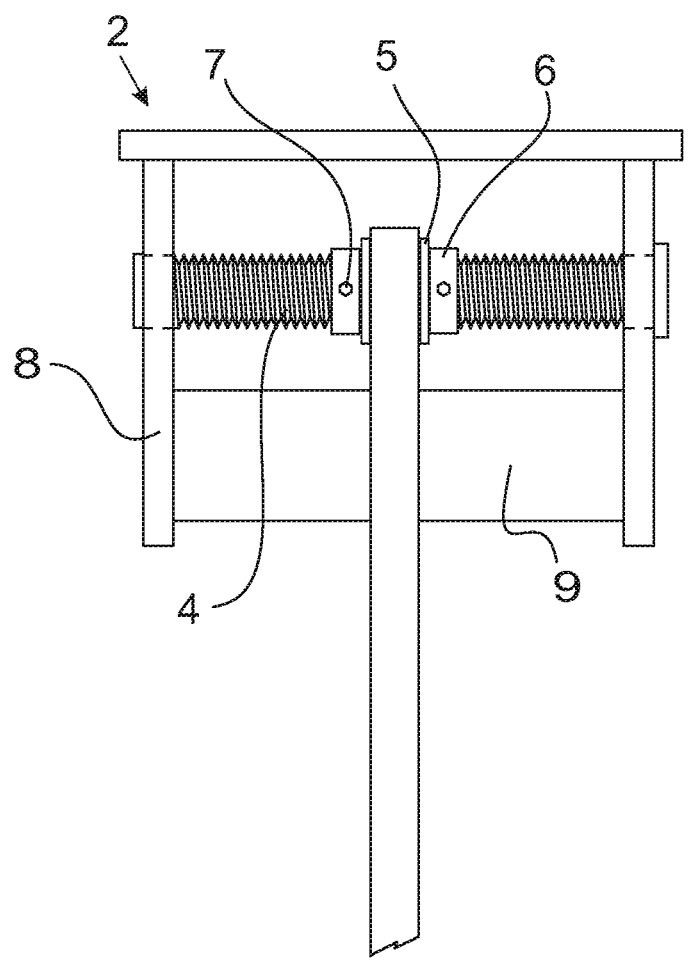
FIG. 10 depicts a close-up rear view of the rock knocker bracket of FIG. 9.

As depicted in FIGS. 9 and 10, according to another embodiment, the adjustable bar bracket 2 holds a threaded pin 4, and the inside surfaces of the two bar retainers 6 are likewise threaded. Turning the bar retainers 6 about the pin 4 causes the bar retainers 6, and thus the rock knocker bar 1 and the washers 5, to move along the length of the pin 4 and thus laterally (side to side) along the bottom of the truck body. Fasteners such as bolts 7 hold the bar retainers in the desired lateral position.

Figure 11:
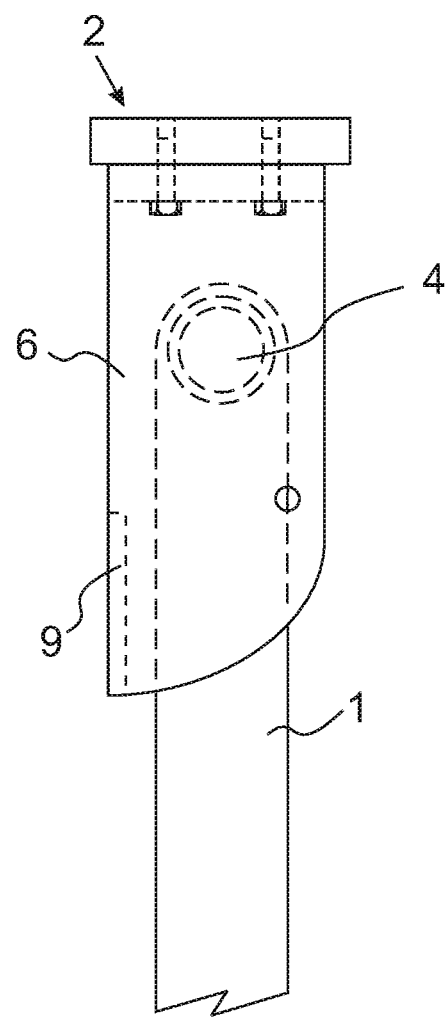
FIG. 11 depicts a close up side view of an adjustable rock knocker bracket according to another embodiment of the present disclosure.
Figure 12:
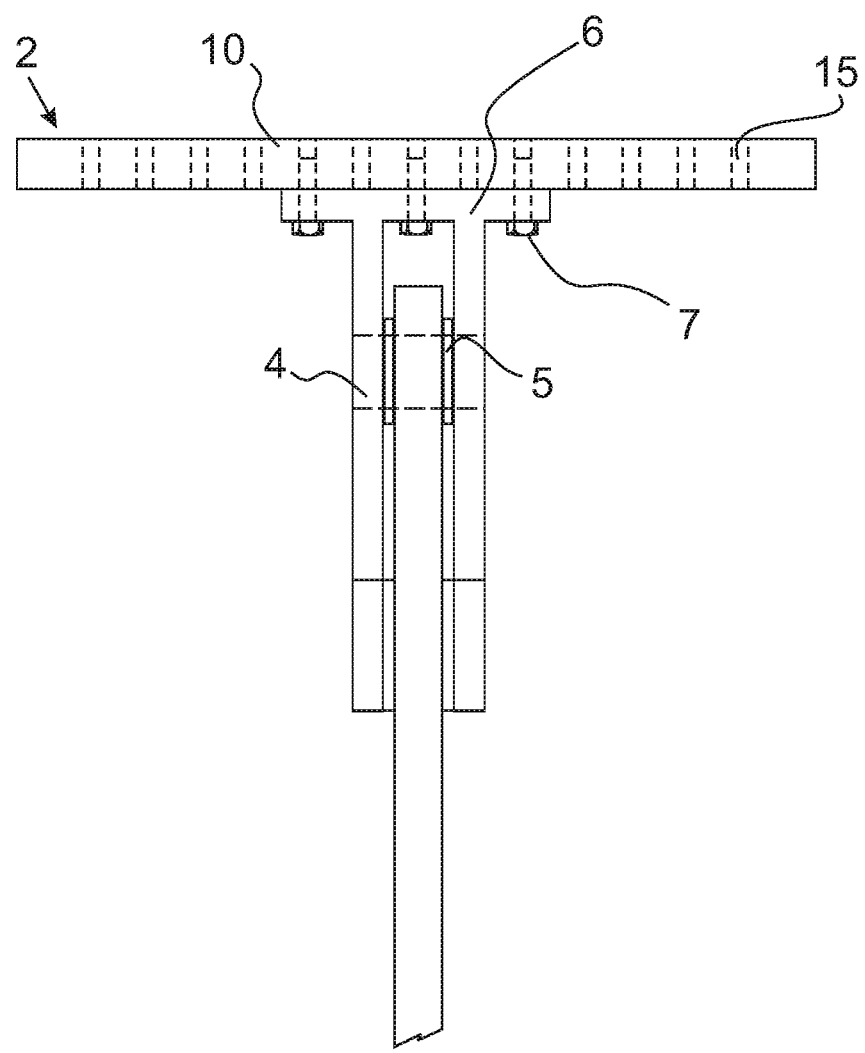
FIG. 12 depicts a close-up rear view of the rock knocker bracket of FIG. 11.

As depicted in FIGS. 11 and 12, according to another embodiment, the lateral location of a generally U-shaped bar retainer 6 is adjusted by using bolts 7 screwed into threaded holes 15 in a top plate 10 of a rock knocker bracket 2. That is, similar to the embodiment described with respect to FIGS. 5-7, the location is adjusted by unscrewing the bolts 7, sliding the retainer along the pin 4 to the desired location, and using bolts 7 to mount the bar retainer 6 to the top plate 10 of the bracket 2. According to this embodiment, the top plate 10 depicted in FIG. 8A (that is, with slots 13 instead of threaded holes 15) may also be employed to provide greater placement flexibility.

Figure 13:
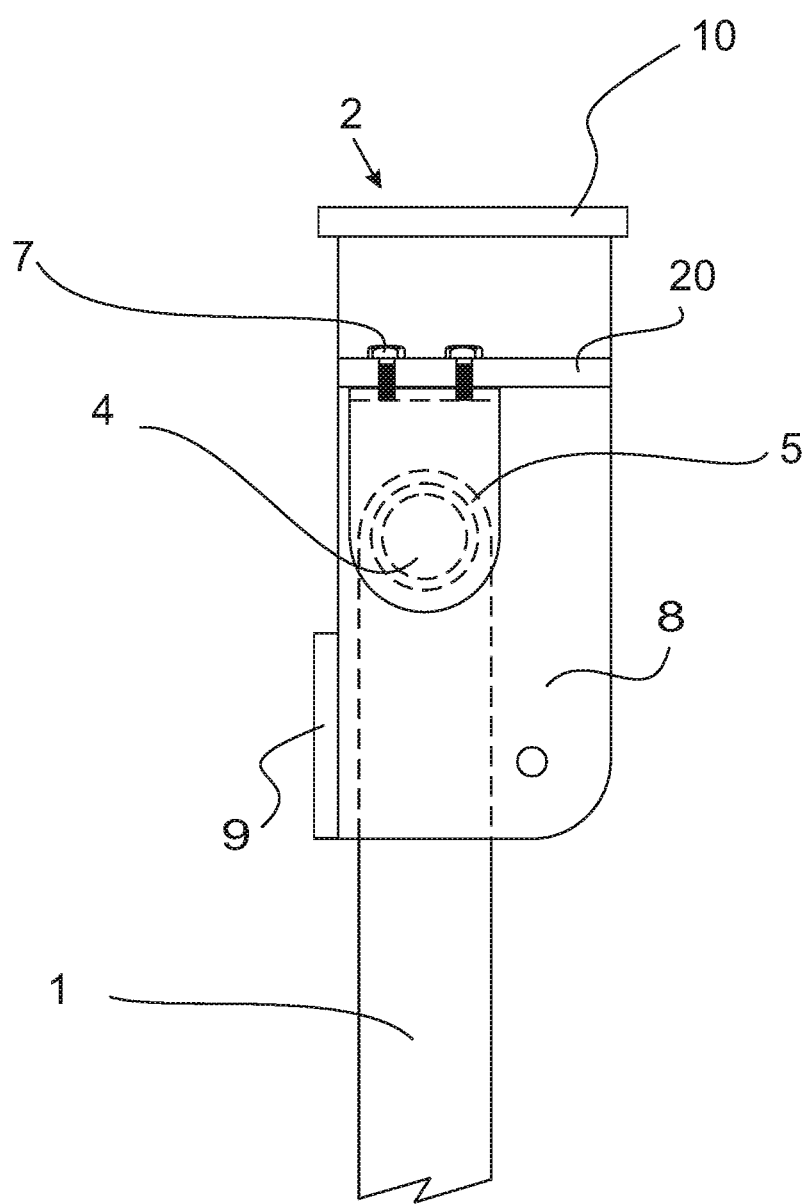
FIG. 13 depicts a close up side view of an adjustable rock knocker bracket according to another embodiment of the present disclosure.
Figure 14:
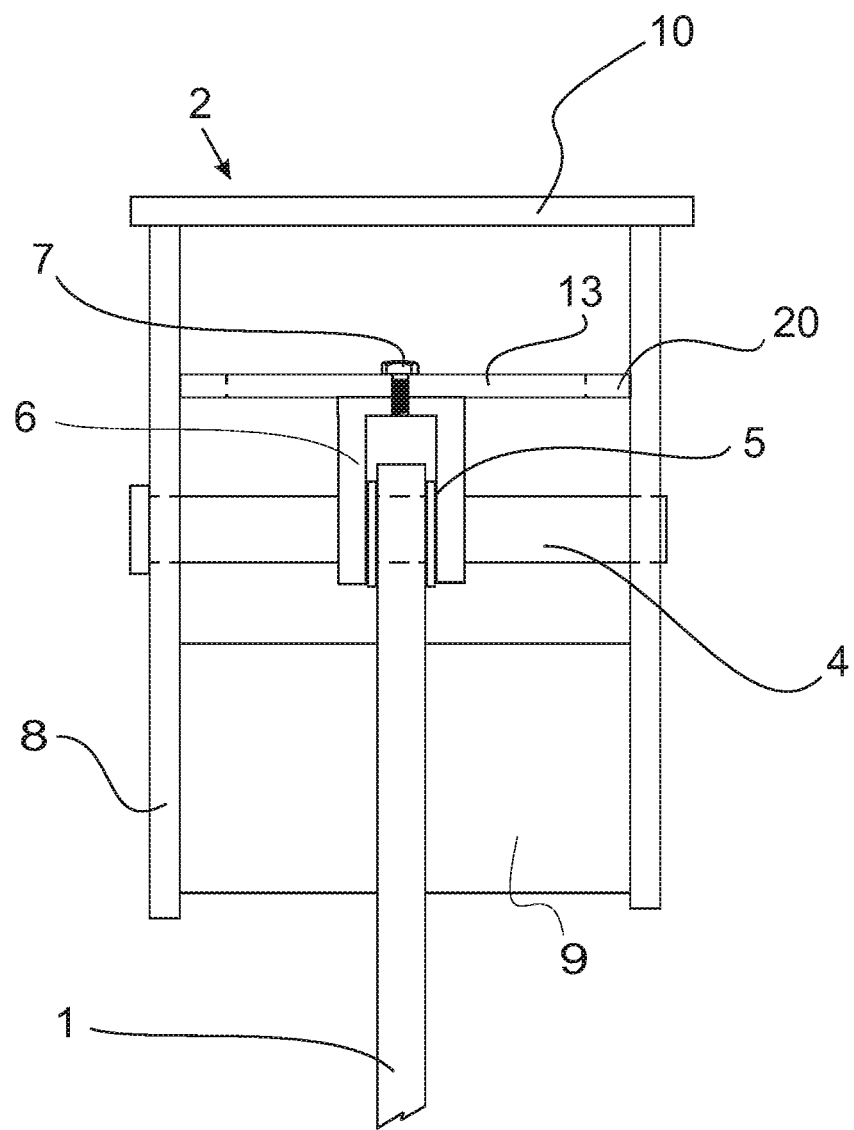
FIG. 14 depicts a close-up rear view of the rock knocker bracket of FIG. 13.

As depicted in FIGS. 13 and 14, according to another embodiment, the U-shaped bar retainer 6 is laterally adjustable by moving the bar retainer 6 (and thus the lateral location of the rock knocker bar 1) along the pin 4. Bolts 7 are then used to affix the bar retainer 6 to an intermediate mounting plate 20. The mounting plate 20 may be similar to those depicted in FIG. 7 or 8A, or may take other designs. In the embodiment depicted in FIG. 14, the mounting plate 20 has slots 13 machined therein (as depicted in FIG. 8A) through which the bolts 7 are inserted, and rather than using nuts, the upper part of the bar retainer 6 has threaded holes for receiving the bolts 7.

In use, the rock knocker bar 1 is mounted about the pin 4. A bar retainer 6 and a washer 5 are placed on each side of the top of the rock knocker bar 1. Fasteners such as bolts 7 are inserted through the bar retainers 6 and through holes in the pin 4 (or through a mounting plate 20 of the bar retainer 6) to hold the bar retainers 6 (and thus the washers 5 and the rock knocker bar 1) in a predetermined lateral position along the pin 4. As a result, the rock knocker bar 1 may be relatively easily relocated to a different lateral position along the pin 4, and thus on the underside of the truck body, to allow the rock knocker bar 1 to be placed into the void between the two tires, without requiring removal of, and re-attachment of, the bracket 2 from and to the underside of the truck body.

It will be appreciated by those skilled in the art that various rock knocker bracket 2 designs and pin 4 designs and configurations exist that meet the functionality requirements of the various truck bodies and tire configurations used in the industry. Although particular embodiments of the present invention have been described, those of skill in the art will appreciate that various modifications and changes may be made by those skilled in the art without departing from the spirit and scope of the invention. The present invention may be embodied in other specific forms without departing from its structures, methods, or other essential characteristics as broadly described herein and claimed hereinafter. The described embodiments are to be considered in all respects only as illustrative, and not restrictive.

The invention claimed is:

1. An adjustable rock knocker apparatus comprising:
   a bracket configured for attachment to a truck body, the bracket having a first support and a second support;
   a pin mounted to and extending between the first and second supports, the pin configured to accept a first end of a rock ejector and mount the first end of the rock ejector at an adjustable lateral position between the first and second supports, the lateral position being at least partially dependent on the lateral location of tires mounted to a truck chassis on which the truck body is mounted for transport of the truck body; and
   a rock ejector pivotably mounted at a first end to the pin at a selected lateral position on the pin, the rock ejector being retained at the selected lateral position on the pin by at least one bar retainer fixed to the pin and the pin having a plurality of holes formed along the length of the pin, the holes passing at least partially through the pin, for receiving a fastener to fix the at least one bar retainer to the pin.

2. The apparatus of claim 1, wherein, when mounted to the truck body, the rock ejector extends towards the underside of the truck body at the selected lateral position to thereby contact and to exert force on, and thereby remove, debris falling into or accumulating at the selected lateral position.

3. The apparatus of claim 1 wherein the bracket further comprises a bar stop plate configured to limit rotation of the rock ejector on the pin.

4. The apparatus of claim 1, wherein the pin and the at least one bar retainer are correspondingly threaded for positioning the at least one bar retainer laterally on the pin to thereby retain the rock ejector at the selected lateral position.

5. The apparatus of claim 1, wherein the rock ejector is retained at the selected lateral position on the pin by at least one bar retainer positioned on the pin adjacent to the rock ejector, the at least one bar retainer being fixable to the bracket.

6. The apparatus of claim 1, wherein the rock ejector is retained at the selected lateral position on the pin by a bar retainer having a U-shaped configuration and comprising side portions projecting from a central portion, the side portions receiving the pin on either side of the rock ejector and the central portion of the bar retainer being fixable to the bracket.

7. The apparatus of claim 6, wherein the bracket comprises a central portion from which the first and second supports extend, the central portion of the bracket comprising a plurality of holes or slots along its lateral length for receiving a fastener to fix the bar retainer to the central portion of the bracket.

8. An adjustable rock knocker apparatus comprising:
   a bracket configured to be attached to a truck body, the bracket having a first side support and a second side support; and
   a pin mounted to and extending between the first and second side supports, the pin having first and second ends connected to the first and second side supports of the rock knocker bracket, the pin having a plurality of holes formed along the length of the pin, the holes passing at least partially through the pin, for receiving a fastener to fix the at least one bar retainer to the pin, the pin configured to mount a first end of a rock ejector at an adjustable lateral position between the first and second side supports.

9. The apparatus of claim 8 in which the lateral position is at least partially dependent on the lateral location of tires mounted to a truck chassis on which the truck body is mounted for transport of the truck body.

10. The apparatus of claim 8, wherein, when mounted to the truck body, the rock ejector extends towards the underside of the truck body at the selected lateral position to thereby contact and to exert force on, and thereby remove, debris falling into or accumulating at the selected lateral position.

11. The apparatus of claim 8 wherein the bracket further comprises a bar stop plate configured to limit rotation of the rock ejector on the pin.

12. The apparatus of claim 8 wherein the rock ejector is retained at the selected lateral position on the pin by at least one bar retainer fixed to the pin.

13. The apparatus of claim 8, wherein the pin and the at least one bar retainer are correspondingly threaded for positioning the at least one bar retainer laterally on the pin to thereby retain the rock ejector at the selected lateral position.

14. The apparatus of claim 8, wherein the rock ejector is retained at the selected lateral position on the pin by at least one bar retainer positioned on the pin adjacent to the rock ejector, the at least one bar retainer being fixable to the bracket.

15. The apparatus of claim 8, wherein the rock ejector is retained at the selected lateral position on the pin by a bar retainer having a U-shaped configuration and comprising side portions projecting from a central portion, the side portions receiving the pin on either side of the rock ejector and the central portion of the bar retainer being fixable to the bracket.

16. The apparatus of claim 15, wherein the bracket comprises a central portion from which the first and second supports extend, the central portion of the bracket comprising a plurality of holes or slots along its lateral length for receiving a fastener to fix the bar retainer to the central portion of the bracket.

17. An adjustable rock knocker apparatus comprising:
   a bracket configured for attachment to a truck body, the bracket having a first support and a second support;
   a pin mounted to and extending between the first and second supports, the pin configured to accept a first end of a rock ejector and mount the first end of the rock ejector at an adjustable lateral position between the first and second supports, the lateral position being at least partially dependent on the lateral location of tires mounted to a truck chassis on which the truck body is mounted for transport of the truck body; and a rock ejector pivotably mounted at a first end to the pin at a selected lateral position on the pin, wherein the rock ejector is retained at the selected lateral position on the pin by a bar retainer having a U-shaped configuration and comprising side portions projecting from a central portion, the side portions receiving the pin on either side of the rock ejector and the central portion of the bar retainer being fixable to the bracket.

18. The apparatus of claim 17, wherein the bracket comprises a central portion from which the first and second supports extend, the central portion of the bracket comprising a plurality of holes or slots along its lateral length for receiving a fastener to fix the bar retainer to the central portion of the bracket.

19. The apparatus of claim 17, wherein, when mounted to the truck body, the rock ejector extends towards the underside of the truck body at the selected lateral position to thereby contact and to exert force on, and thereby remove, debris falling into or accumulating at the selected lateral position.

20. The apparatus of claim 17 wherein the bracket further comprises a bar stop plate configured to limit rotation of the rock ejector on the pin.

\* \* \* \* \*